UNITED STATES PATENT OFFICE.

JOSEPHUS CRAFT, OF WORTHINGTON, MINNESOTA.

COMPOUND FOR PRESERVING FRUIT.

SPECIFICATION forming part of Letters Patent No. 224,883, dated February 24, 1880.

Application filed May 9, 1879.

*To all whom it may concern:*

Be it known that I, JOSEPHUS CRAFT, M. D., of Worthington, in the county of Nobles and State of Minnesota, have invented a new and useful Improvement in Preserving Fruit, of which the following is a specification.

This invention relates to improvements in the method of preserving the sweetness, natural color, and flavor of fresh fruit; and the object thereof is to effect this preservation without sealing the fruit in air-tight vessels.

It consists in a compound of bisulphite of calcium and biborate of sodium dissolved in glycerine, applied in the following manner: Dissolve ten (10) grains of the bisulphite of calcium and ten (10) grains of the biborate of sodium in one ounce of pure glycerine at a temperature of about 200°. Then mix this ounce of solution in one quart of liquid or sirup formed in the usual way by dissolving sugar in water. Heat this solution to a temperature of about 200°, and pour it over the fruit to be preserved.

The result of this treatment will be the following chemical changes and reactions, carried on slowly as the ingredients of the compound are gradually absorbed by the fruit: The malic acid of the fruit liberates one equivalent of the bisulphite of calcium, which is immediately absorbed by the sirup, and this, in turn, unites with the alkaline biborate, producing a powerful deoxidizing and antiseptic compound, suppressing fermentation and destroying all microscopic organisms and fungi. In addition, firmness is given to the fruit, and all the natural sweetness, freshness, color, and flavor are preserved.

The compound is perfectly harmless in its effects on the system, and gives no unpleasant taste or odor to the fruit. The glycerine is a deoxidizing agent, but is used more especially for its remarkable solvent and penetrating properties. The bisulphite of calcium being very sparingly soluble in pure water is very much more readily dissolved in pure glycerine, and by its remarkable penetrating properties the bisulphite is much more readily absorbed by the fruit, there meeting the malic acid and undergoing the necessary displacement by chemical action.

Having thus described my invention, I claim as new and desire to secure by Letters Patent—

A compound for preserving fresh fruit, composed of bisulphite of calcium and biborate of sodium dissolved in glycerine and sirup, substantially as described.

JOSEPHUS CRAFT, M. D.

Witnesses:
R. R. MILLER,
J. O'NEILL.